United States Patent
Rosenberg

[15] 3,696,932
[45] Oct. 10, 1972

[54] DISPOSABLE FILTER ASSEMBLY
[72] Inventor: David Rosenberg, Glen Cove, N.Y.
[73] Assignee: Pall Corporation, Glen Cove, N.Y.
[22] Filed: Sept. 30, 1970
[21] Appl. No.: 76,833

Related U.S. Application Data

[63] Continuation-in-part of Ser. No. 779,050, Nov. 26, 1968, abandoned.

[52] U.S. Cl..............................210/437, 210/446
[51] Int. Cl..........................................C02c 1/14
[58] Field of Search......210/169, 436, 437, 441, 449, 210/446, 451, 453, 455, 457, 477, 223, DIG. 17, 448

[56] References Cited

UNITED STATES PATENTS

| | | |
|---|---|---|
| 3,342,339 | 9/1967 | Riolo..........................210/223 |
| 2,839,056 | 6/1958 | Mally..........................210/453 |
| 3,329,269 | 7/1967 | Niccum...............210/DIG. 17 |
| 3,384,242 | 5/1968 | Kudlaty et al.............210/436 |
| 3,370,711 | 2/1968 | Hitzelberger et al......210/448 |

Primary Examiner—Reuben Friedman
Assistant Examiner—T. A. Granger
Attorney—Janes and Chapman

[57] ABSTRACT

A disposable filter assembly is provided with a leak-proof connection between the filter element and the filter housing to prevent external leakage, and a direct fluid connection between the interior of the filter element and one fluid line, thereby ensuring that unfiltered fluid will not by-pass the filter element and contaminate the downstream fluid line. In the preferred embodiment the fluid line connection and the filter element-housing connection are formed as an integral part of one filter element end cap. A vent also is provided to release air from the assembly when the assembly is installed and put on-stream.

39 Claims, 6 Drawing Figures

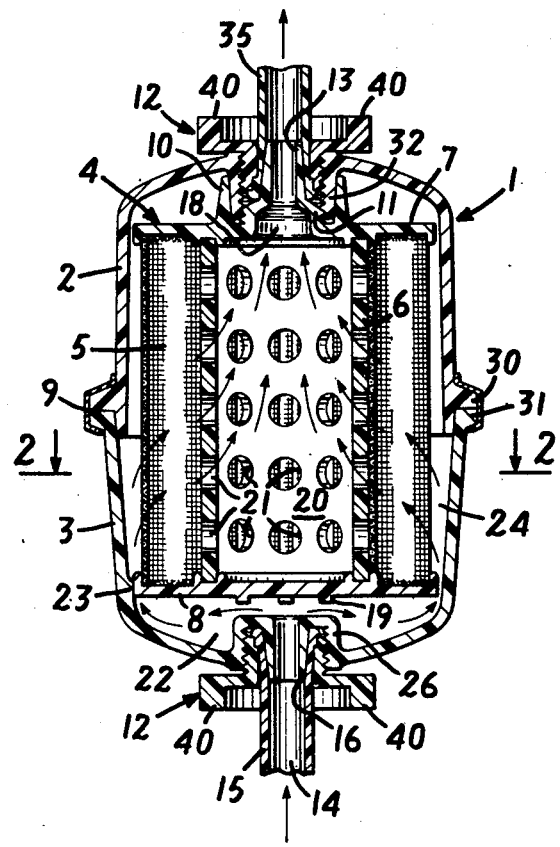

DISPOSABLE FILTER ASSEMBLY

This application is a continuation-in-part of Ser. No. 779,050, filed Nov. 26, 1968 and now abandoned.

Disposable filter assemblies comprising both the filter element and the housing therefor are particularly useful in fluid systems containing contaminants that can be harmful if handled, such as bacteria and radioactive residues, as well as in systems when cleaning and sterilization between uses is impractical, as in the case of filtration of blood and other body fluids, and of medicament fluids for therapeutic administration. Disposal of the entire filter assembly when either the unit operation has ended, or the useful life of the filter element has been exhausted, eliminates the cleaning problem, and the technician or operator need not come in contact with a contaminated element. All of the contaminants are contained within the assembly, thereby making safe the removal of an exhausted assembly from the fluid system.

Disposable filter assemblies are also more desirable than reusable filters where the filter elements have to be quickly and frequently replaced and are used in large numbers, as in the case of transfusion systems where stopping the flow for any length of time may endanger the patient. Obviously, more time is require to remove an exhausted filter element from a housing and replace it with a clean element than to remove and replace the entire filter assembly. However, the cost of a disposable filter assembly must be low, if replacement cost is to be kept low enough to make their use attractive, as compared to reusable filter assemblies.

In order to retain harmful contaminants within the filter housing and to prevent their passage downstream, as well as to prevent contamination of the fluid contents by atmospheric contaminants, it is essential that the fluid seals between the filter element and the filter housing and the filter housing and the atmosphere be absolutely leaktight. This is of extreme importance in the filtration of intravenous fluids in transfusion systems, for if by-pass of the filter element occurs, bacteria or other harmful contaminants, such as thrombi in the case of blood transfusions, may enter the patient. Likewise, the line fitting connections should be designed to facilitate the speedy assembly and disassembly of the filter unit to the fluid line, and to prevent spillage of fluid during this operation.

A further problem presented by disposable filter assemblies is the venting of air or other gas when the assembly is first filled with fluid and put on-stream. Filter elements do not pass a gas readily, especially if the pore size is small, and air is easily trapped on one or the other side of the element. The gas vents through a fluid line if it can move in a generally upward direction, but this means turning the assembly over so that all lines lead up to vent the gas, and this means that the housing itself must have all corners turned upward, too, in this process, to avoid trapping a gas there. After the filter element is wetted with or filled with fluid, it is even more resistant to passage of a gas, and will not pass a gas unless the pressure exceeds the bubble point of the filter.

This is a serious matter when the filter is used in therapeutic administration since the entry of a gas such as air in a patient can lead to dangerous consequences, and even death.

In accordance with the present invention, a low cost disposable filter assembly is provided having direct fluid communication between the interior of the filter element and the fluid line, and a leakproof connection between the filter element and the housing, thereby ensuring that unfiltered fluid will not by-pass the filter element and enter the downstream fluid line.

The assembly has a vent in the housing for release of air when the assembly is filled with fluid upon putting it to use, and this vent preferably has a seal that is tapered, and is therefore bacteriaproof and also leaktight.

The disposable filter assembly of this invention comprises a filter housing having an inlet and an outlet and preferably a vent in the housing for release of gas contained therein; a filter element disposed within the housing across the line of flow from the inlet to the outlet; and attaching means between the filter element to the filter housing which provides both a fluidtight seal between the filter element and the housing to prevent external leakage and a direct fluid connection between the interior of the filter element and a fluid line to prevent by-pass of unfiltered fluid. The attaching means preferably provides a tapered connection for a fluidtight and bacteriatight seal between the filter element and the housing.

The attaching means comprises a first tubular member extending outwardly from one end of the filter element; a second tubular member at the inside of one end of the filter housing, to engage and form a fluidtight seal against the tubular member, the first tubular member and the second tubular member preferably being tapered to form a fluidtight and bacteriatight tapered seal therebetween and a tubular adaptor within the first tubular member to provide direct fluid communication between the interior of the filter element and a fluid line.

In a preferred embodiment of this invention, the tubular member and the tubular adaptor are both attached to or formed as an integral part of one end cap of the filter element.

In many systems, particularly blood transfusion and outside-of-patient circulation systems, as well as other medical fluid administration and circulation systems, it is essential that the filtered flow stream not contain any particles of the size the filter element is intended to remove. In such systems, the fluid must be prevented from by-passing the filter element. This is achieved in the present invention by providing direct fluid communication between the interior of the filter element and the fluid line via the tubular adaptor reducing the seals required to one. To further prevent the entry of contaminants into the downstream fluid line, the connection between the tubular member of the filter element and the mating section of the housing seals against internal rather than differential pressure, and thereby prevents external leakage. Therefore, fluid that under extreme conditions does by-pass this seal can not enter the downstream fluid line, since there is no fluid communication therebetween.

The tubular member can be cylindrical, of uniform internal open diameter. It can also be frustoconical, however, and in fact in the preferred embodiment of this invention, the tubular member which extends outwardly from one end of the filter element has a tapered interior surface. A corresponding second tubular member extends inwardly from one end of the filter housing and has a tapered exterior surface to mate with and form a fluidtight seal against the tapered interior surface of the first tubular member. The second tubular member can also be cylindrical mating with the first, if the first is cylindrical.

The mating members are held together in a fluidtight seal by a threaded adaptor, also attached to or formed as part of the end cap of the filter element, concentric to and threaded into the second tubular member, and extending outwardly therefrom. The adaptor also serves as the connection to the fluid line. This construction provides a simple and efficient means for forming a fluidtight seal between the line and the housing, and between the housing and the filter element, without the need for sealing rings or the like. Other suitable mechanical connecting means, such as a bayonet connection and a tongue-and-groove connection, can be used on the adaptor in place of the threaded connection. In addition, the adaptor can also be bonded to the housing, to ensure that it will not loosen if subjected to vibration during use.

In this construction, external leakage of unfiltered fluid between the mating cylindrical posts of the element end cap and the housing, as well as entry of or escape of bacteria and other microorganisms, is virtually impossible due to the tapered seal between the tubular members. The relative lengths of the adaptor and the sealing surfaces of the tubular members are such that the two sealing surfaces are in partial contact prior to the engagement by the adaptor of the threads or other connecting means. By providing a gradual taper on the mating seal surfaces, the clearances can be made such that misalignment of the threads at the time of their engagement is impossible. This also ensures that the mating seal surfaces of the element and the housing will be aligned properly. The gradual tapers on the sealing surfaces can be formed with locking angles, such that the clearance between these two surfaces is reduced and a tighter seal is provided by the further tightening of the connecting adaptor.

The housing and the filter element end caps can be formed of metal such as stainless steel or of plastic material such as polypropylene or polyethylene, polycarbonates, polystyrene, polytetrafluoroethylene, polyamides, or synthetic rubbers. Plastic materials are cheaper and susceptible to mass fabrication by molding or casting techniques, and are preferred. If the plastic materials are relatively soft, they will deform at their contact point under stress, such as is provided by the connecting adaptor, in the same manner as a gasket, thereby forming a fluidtight seal that will prevent the passage of submicronic particles, and rendering unnecessary sealing means, such as O-rings and gaskets. Even if there are scratch marks or score marks on one of the mating surfaces, the material is soft enough so that under the stress provided by the threaded connection, a fluidtight seal will still be maintained. However, it should be noted that since the seal surfaces are located on the interior portions of the component parts, damage is unlikely to occur.

In another embodiment of this invention, the tubular member extends outwardly from the filter element end cap and has a peripheral shoulder formed in the leading edge of an exterior cylindrical surface, and a cylindrical interior passage that is threaded. One end of the filter housing is formed with a corresponding inwardly projecting portion having a through cylindrical bore, with an internal annular ledge providing a stop for the tubular member at the shoulder thereof. The mating parts are bonded together so that a permanent fluidtight seal is formed between the abutting shoulder and ledge surfaces. By utilizing plastic material, such as polypropylene or polyethylene, for the filter housing and filter end cap, a fluidtight seal between the abutting surfaces of the shoulder and ledge can be efficiently and inexpensively obtained by solvent bonding, spin-welding, or friction-welding. Other bonding techniques, such as heat sealing, solvent bonding or epoxy resin bonding in the case of plastic materials, or brazing, soldering or welding in the case of metallic materials, can also be utilized. Although, unlike the first described embodiment, the sealing surface of the tubular member is exposed prior to assembly and thereby subject to damage by mishandling. Maintaining unmarked or unscratched seal surfaces in this embodiment is unnecessary, since the fluidtight seal depends upon the continuity of the bond rather than the smoothness of the seal surface. In fact, some bonding techniques, such as epoxy resin bonding, require rough rather than smooth mating surfaces. The extent of roughness depends upon the materials to be bonded together.

The diameters of the cylindrical tube and the cylindrical bore are such that the clearances therebetween are kept to a minimum, without interference. The tube thereby slidably engages the sides of the bore upon assembly, but is prevented from excessive lateral movement. This ensures that there will be no cocking of the tube within the bore, and that the entire surface of both the shoulder and ledge will be in contact. In this manner, a continuous fluidtight bond between the abutting surfaces to prevent external leakage is assured.

In both embodiments, the filter element end cap is also provided with a tubular connecting adaptor that extends outwardly from within the tubular member, to provide direct fluid communication between the interior of the filter element and a fluid line. The connecting adaptor can be a nipple, tapered on its exterior surface so that it may be readily inserted into the tubing of the fluid line. It can also have the fluid line tubing inserted and bonded in place so that the entire assembly and tubing can be inserted and removed together as a unit, without having to make or break fluid line connections. This can be useful in certain medical systems, such as administration sets for blood filtration in extra corporeal blood circulation systems, and for intravenous feeding.

In some embodiments, however, a tapered nipple is utilized. A bushing closely encircling the tubing threadably engages the interior surface of the tubular member of the housing or the interior surface of the tubular member of the filter element end cap and thereby secures the tubing in a fluidtight seal over the tapered nipple. The busing can also be made to engage the interior surface of either tubular member by any other suitable means, such as a bayonet joint or a tongue-and-groove joint, in place of the threads.

Forming the tubular member and the connecting adaptor as one piece with or as an integral part of one filter element end cap further reduces the probability of either external or element by-pass leakage, since the number of fluid seals is kept to an absolute minimum. This construction eliminates all possibility of faulty seals developing due to improper assembly of the tubular member and the connecting adaptor to the end cap. It also reduces cost.

Similarly, the opposite end of the housing can be formed with a tubular adaptor which extends inwardly from the center of the closed end. A hollow nipple having a tapered exterior surface extends outwardly from within the adaptor to provide communication between the fluid line and the interior of the housing. An annular space is formed between the nipple and adaptor so that the fluid line tubing may be installed over the tapered nipple and held in a fluidtight connection therewith by a close-fitting bushing, which engages the interior surface of the adaptor by means of threads, a bayonet joint, a tongue-and-groove arrangement, or any other suitable means known to those skilled in the art. Either resilient tubing or flared-end rigid or flexible tubing can be utilized in the fluid line, since the nipple and bushing are designed to form a fluidtight seal when connected to either.

As discussed above with regard to the filter element connection, the tubing can also be bonded within a tube, rather than installed over a nipple. The bushings at both the filter element-fluid line and the filter housing-fluid line connections each have two wing-like flanges 180° apart, so that they can be readily hand tightened and loosened, thereby facilitating the assembly and disassembly of the filter from the fluid line without disturbing the filter element, which remains sealed within. If resilient tubing is used in systems where the pressure is relatively low, i.e., not greater than about 5 psig, and the filter assembly is not suspended from the tubing, the use of the bushing may not be required, since the stretching of the resilient tubing over the nipple will provide a leaktight connection. This further reduces the time required for replacement of the disposable filter assembly within the fluid line. However, this is generally not advisable in medical or other critical systems, since the filter assembly may be accidentally shaken loose from either or both fluid lines.

In the preferred embodiments of this invention both the inlet and outlet housing portions are bell-shaped, and are formed with peripheral external mating flanges at their open ends. Upon assembly of the filter, these flanges are bonded or spin-welded together around the entire circumference of the housing, thereby forming a fluidtight seal which is capable of withstanding an internal pressure of up to several hundred psi, depending, of course, upon the materials of construction. The resultant shape of the assembled housing, which is generally cylindrical with partially hemispherical closed ends, is also designed for optimum structural strength.

Thermoplastic materials other than polypropylene and polyethylene can also be utilized for the formation of the housing and element end caps. These include polyvinyl chloride, vinyl chloride-vinylidene chloride copolymers, polymethylmethacrylate, polystyrene, polyamides, polytetrafluoroethylene, polyfluorotrichloroethylene and polycarbonates. These materials are all lightweight, readily molded, shaped or formed, and easily bonded to each other. Their use is therefore preferred for all the nonporous parts of the disposable filter assembly of this invention.

It is also possible to form the nonporous parts from metallic materials such as aluminum, stainless steel, copper, or any other material commonly used for these proposes. However, since these and other metallic materials are more difficult to form the therefore more expensive to produce, plastic materials are preferred.

The filter element can be cylindrical, conical, or any other convenient shape, having either a flat or corrugated filter medium, depending upon the surface area requirements for the particular application. However, in the preferred embodiments, the filter element comprises a corrugated filter sheet formed into a cylinder around a central open passage. A cylindrical core containing apertures for the passage of filtered fluid is disposed within the open central passage adjacent the downstream side of the corrugations of the filter medium to provide structural strength for the filter element. End caps are bonded to both open ends of the cylinder in order to seal off the corrugated filter medium, to prevent the by-pass of unfiltered fluid. One end cap can be merely a flat disc-like member permanently bonded to the filter medium and the core. The other end cap, in addition to sealing off the corrugated filter medium, provides the fluidtight connection between the filter element and both the filter housing and a fluid line as described above.

Usually the disposable filter assembly is installed in the fluid system such that flow proceeds through the filter element from the outside to the inside, and the connecting adaptor which provides direct communication to the interior of the element is connected to the downstream fluid line. This provides maximum open surface area, and volume of open space for collection of contaminant. However, it should be noted that the flow direction can be in the opposite direction, from inside to outside. In this case, it may be desirable to provide an outer support for the filter element sheet under high differential pressure. If the disposable filter assembly of this invention is used in medical or pharmaceutical fluid systems where the pressures are relatively low, the corrugated filter sheet in many cases is sufficiently strong to safely accept flow from inside out or outside in without support.

The filter element can be formed from any porous filter material. Any woven or nonwoven fibrous material composed of natural fibers, such as cotton, jute, sisal, hemp, flax, linen, or wood fibers; metal fibers such as stainless steel, copper, and aluminum; and synthetic plastic fibers and monofilaments such as polytetrafluoroethylene, fluorinated ethylene-propylene resins, nylon, polyesters, polyvinyl chloride, polyacrylonitrile, polyvinylidene chloride, acetate rayon and viscose rayon, alone or in admixtures, can be utilized. These can be formed in woven square weave or Dutch twill weave fabric or mesh, or in nonwoven mats, bats, or layers. Papers of various types made up of cellulose fibers, cellulose cloth and plastic fibers such as polyvinyl chloride, cellulose acetate, polyvinylidene chloride, nylon and other plastic filaments mentioned above, coated or impregnated with any of these plastic or fibrous materials, can be utilized as a microporous layer.

Impregnated and/or coated sheet materials in particular can be made microporous with less than 1 to 0.5 micron pores, and such materials include the microporous materials of U.S. Pat. Nos. 3,158,532 to Pall et al., 3,238,056 to Pall et al., 3,246,767 to Pall et al., and 3,353,682 to Pall et al.

In one preferred embodiment of this invention, the filter element comprises a microporous corrugated filter material which is prepared in sheet form following the procedure of Example 1 of U.S. Pat. No. 3,353,682. The average pore size of this material is 0.1 micron, and the maximum pore size less than 0.35 micron, as determined by 100 percent removal of the bacteria *Serratia marcescens*. When the filter element is constructed with this filter material, the disposable filter assembly of this invention is particularly useful in pharmaceutical and medical applications, where it is essential that bacteria and other submicronic particles be completely removed from fluids.

In another preferred embodiment, especially for filtration of blood, the filter element is a woven square-weave mesh having mesh openings of from 15 to 45 microns made of nylon or polyester monofilaments.

The filter element can of course have any desired pore size, but for most uses in which the disposable characteristic is advantageous the pore size is less than 150 microns and preferably less than 50 microns, and for filtration of bacteria, less than 1 micron and preferably less than 0.3 micron.

The disposable filter assembly of this invention is also useful for the removal of colloidal haze from toiletries, thereby improving their appearance and preventing subsequent precipitation of solids, quantitative removal of radioactive corrosion products from spent nuclear power plant water, and for providing ultraclean wash and rinse water for critical applications, such as television tube, transistor and electronic component production for ampoule and vial washings.

The preferred embodiments of this invention are shown in the drawings in which.

Figure 1:
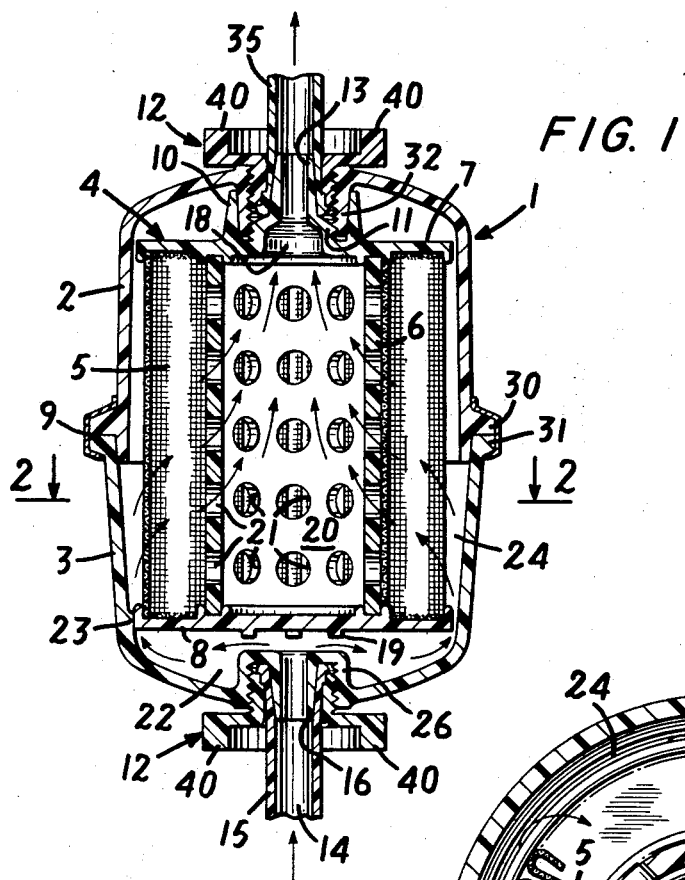
FIG. 1 is a longitudinal cross-sectional view of one embodiment of the disposable filter assembly of this invention.
Figure 2:
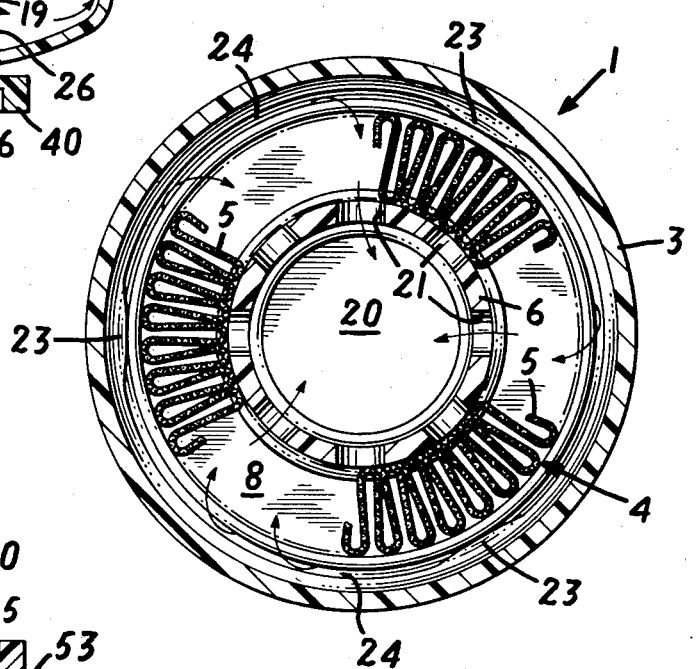
FIG. 2 is a cross-sectional view taken along the lines 2—2 and looking in the direction of the arrows in FIG. 1.

The disposable filter assembly of this invention as shown in FIGS. 1 and 2 comprises a housing 1 made in two plastic bell-shaped portions 2 and 3. The portion 2 of the housing 1 is formed with a peripheral external flange 30 which mates with and seals against a corresponding flange 31 formed at the periphery of the other housing portion 3. The abutting faces of the two flanges 30 and 31 are friction- or spin-welded together around their entire circumference in a fluidtight seal at 9, so that the housing 1 is in one piece, permanently bonded together Disposed within the housing 1 is a filter element 4 comprising a corrugated microporous bacteria-removing filter sheet 5 having a maximum pore size of about 0.35 micron, formed into a cylinder and enclosing a central open passage 20. An internal support core 6 containing perforations 21 is disposed within the central passage 20, in contact with the interior peaks of the corrugations of the corrugated filter sheet 5, in order to provide internal structural support for the filter element.

The filter cylinder has one open end closed off by a bottom end cap 8, bonded to the filter sheet 5 and the perforated core 6 in a leaktight seal. The other open end of the filter cylinder is closed off by end cap 7, which has a central passage 18 therethrough. A tubular member in the form of cylindrical post 10, which is an integral part of the end cap 7, mates with and seals against a corresponding tubular member in the form of cylindrical post 32 integral with portion 2 of the housing. The posts 10 and 32 have mating frustoconical sections which engage each other to provide a fluidtight and bacteriatight seal between the filter element and the housing. A threaded adaptor 11 concentric to the post 10 is also formed as an integral part of end cap 7, and engages threads formed on the interior wall of the tubular post 32. The frustoconical sealing surfaces are formed with locking angles, such that the clearance between these two surfaces is reduced and a tighter seal is provided by the further tightening of the threaded adaptor 11. The relative lengths of the threads and the sealing surfaces are such that the frustoconical surfaces of the posts 10 and 32 are in partial contact prior to the threading engagement of the adaptor 11 to the tubular post 32. This ensures that the mating frustoconical surfaces and the threads will be aligned properly.

A connecting adaptor in the form of a hollow tapered nipple 13 designed to mate with and seal against the fluid line tubing extends outwardly from the threaded adaptor 11 through the open center of the cylindrical post 32 of the housing, to provide direct fluid communication between the interior of the filter element 4 and the tubing of the fluid line 35. The passage 18 makes possible direct fluid flow via the nipple 13 between the central open portion 20 of the filter element 4 and the fluid line 35.

A bushing 12 which also engages the threaded portion of the post 32 secures the tubing of the fluid line in a leaktight position over the tapered nipple 13. The bushing 12 is formed with two wing-like flanges 40, 180° apart, such that it can be readily hand-tightened or loosened, to facilitate connection and detachment of the filter assembly to the fluid line.

Similarly, an internally threaded cylindrical adaptor 26 extends inwardly from the center of housing portion 2. A hollow tapered nipple 16 located within the center of the adaptor 26 extends outwardly, to engage the fluid line tubing 15. A bushing 12 threadably engages the adaptor 26, and thereby secures the tubing of the fluid line 15 in a leaktight seal over the nipple 16.

Ribs 23 formed on the internal surface of the housing portion 3 align the filter element within the housing. Protrusions 19 extending from the lower portion of the end cap 8 of the filter element 4 prevent the end cap 8 from closing off the line by resting on top of the adaptor 26. This can occur only in extreme cases of tolerance build-up, where the housing is as small as possible within the prescribed tolerances, and the element is as large as possible within the prescribed tolerances.

In normal use, fluid enters through the passage 14 of the tubing 15, passes through the nipple 16, and into the entrance chamber 22. The fluid then proceeds into the annular space 24 between the filter element and the housing, and thence through the filter sheet 5. Filtered fluid flows via the perforations 21 of the core 6 into the central passage 20, whence it passes via passage 18 into the downstream fluid line 35. It should be noted that the fluidtight seal between the tapered surfaces of the mating posts 10 and 32 prevents the external leakage of unfiltered fluid. However, should a leak develop at their juncture, under extreme circumstances, it is not possible for unfiltered fluid to enter the downstream fluid line 35, since the line 35 connects directly with the interior of the filter element via the outlet nipple 13. Therefore, there is no way for unfiltered fluid to bypass the filter element. Furthermore, any leakage that may develop at the connection of the line 35 and the outlet nipple due to faulty installation will be of filtered fluid, and will not contaminate the surrounding area.

To remove this filter assembly from the fluid lines 15, 35, the system is shut off, the bushings 12 are loosened, and the line 15 removed from the inlet nipple 16 and the line 35 from the outlet nipple 13. The filter assembly can then be discarded, without disturbing the filter element, and without the danger of fluid leakage, and a new disposable filter assembly can be installed in a few seconds or minutes.

The fluid flow through the filter assembly can also be in the reverse direction, from line 35 to line 15. In this case, the filter element is operated from the inside out.

Figure 3:
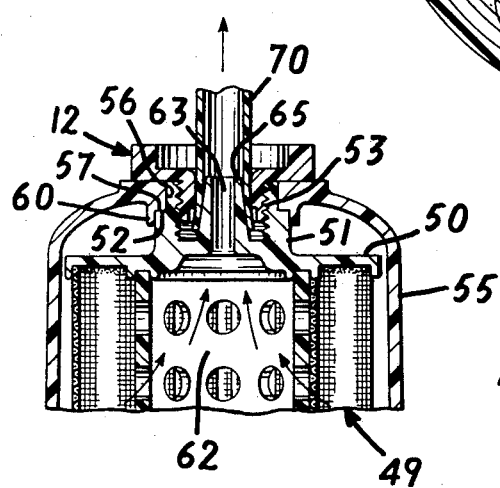
FIG. 3 is a partial longitudinal cross-sectional view of another embodiment of the disposable filter assembly of this invention.

In the embodiment shown in FIG. 3, the end cap 50 of filter element 49 is plastic, such as polycarbonate, and is formed with a cylindrical hollow post 51 having a flat circular shoulder 52 formed into the exterior surface of the leading edge, and threads 53 formed on the interior surface. One end of the plastic filter housing 55, also of polycarbonate, is formed with a corresponding cylindrical bore 56 having a flat annular ledge 57 and a lip 60. The cylindrical hollow post 51 engages the face of the cylindrical bore 56 in a manner such that the ledge 57 provides a stop for the shoulder 52, and the lip 60 provides guidance for the post 51. The end cap 50 and the housing 55 are spin-welded or friction-welded together, such that a permanent fluidtight bond is formed between the abutting surfaces of the shoulder 52 and the ledge 57, to prevent external leakage.

A connecting adaptor in the form of a hollow tapered nipple 65 is also formed as an integral part of the end cap 50, and is designed to mate with and seal against the fluid line tubing 70, to provide direct fluid communication between the interior 62 of the filter element 49 and the fluid line tubing 70 via passage 63. A bushing 12 threadably engages the threads 53 on the interior surface of the post 51 to secure the tubing 70 in a fluidtight seal over the nipple 65.

As in the case of the embodiment illustrated in FIG. 1, the cylindrical hollow post of the element end cap in this embodiment provides means for sealing the filter element to the filter housing to prevent external leakage. However, should leakage occur due to a faulty bond between the abutting surfaces of the shoulder 52 and the ledge 57, unfiltered fluid cannot enter the fluid line 70, since the only fluid communication between the fluid line 70 and the disposable filter assembly is via the passage 63, which extends directly from the interior of the filter element through the tapered nipple 65. Therefore, leakage of unfiltered fluid at the seals to bore 56, if it does develop, will pass to the exterior of the housing, and cannot by-pass the filter element and enter the fluid line 70.

Figure 4:
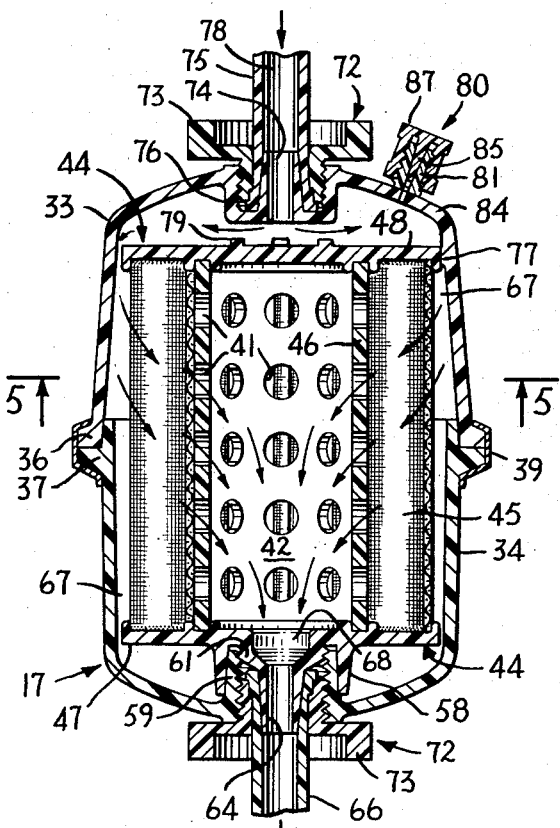
FIG. 4 is a longitudinal cross-sectional view of another embodiment of the disposable filter assembly of this invention.
Figure 5:
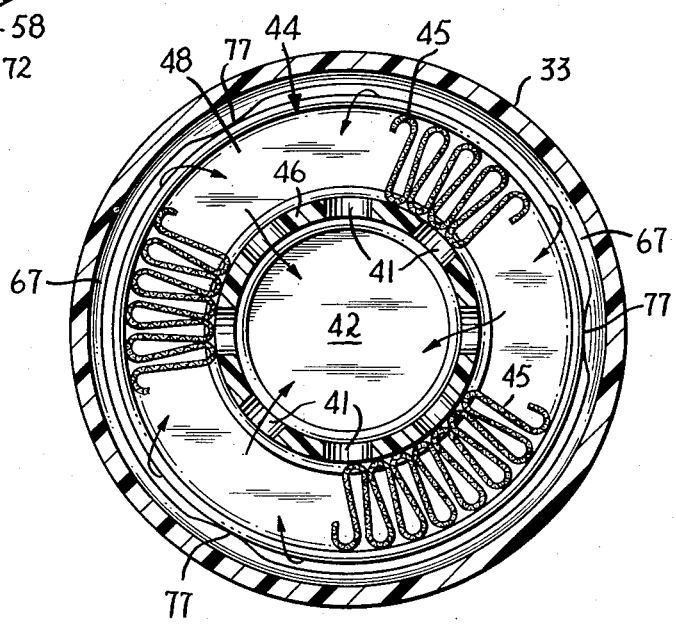
FIG. 5 is a cross-sectional view taken along the lines 5—5 and looking in the direction of the arrows in FIG. 4.
Figure 6:
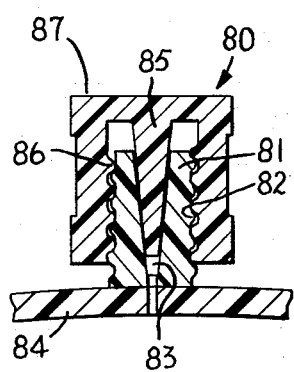
FIG. 6 is a detailed enlarged view of the vent plug in the filter assembly of FIG. 4.

The disposable filter assembly shown in FIGS. 4 to 6 comprises a housing 17 made in two plastic bell-shaped portions 33 and 34. The portion 33 of the housing 17 is formed with a peripheral external flange 36 which mates with and seals against a corresponding flange 37 formed at the periphery of the other housing portion 34. The abutting faces of the two flanges 36 and 37 are friction- or spin-welded together around their entire circumference in a fluid-tight seal at 39, so that the housing 17 is in one piece, permanently bonded together.

The housing portion 33 has an air vent 80, best seen in FIG. 6. An upstanding annular valve seat 81, having external threads 82, and a through bore 83 extending through the housing wall 84 to the interior of the housing 17, is affixed to the exterior of the wall 84. The bore 83 has an inwardly diminishing diameter, tapered towards the housing portion 33. A correspondingly tapered plug 85 is seated in the valve seat, fitting snugly in the bore 83 in a leaktight and bacteriatight seal, and is held there firmly due to the threaded engagement with the exterior of the valve seat via the internal threads 86 on the plug cap 87. The plug cap is removable by rotating the cap 87 until the threads are disengaged. The plug 85 is tapered at a less sharp angle than the seat, so as to more forcibly engage the seat, the further it is inserted into the bore 83.

Disposed within the housing 17 is a filter element 44 comprising a corrugated filter sheet 45, made of polyester monofilament square-weave mesh, with 45 micron mesh openings, formed into a cylinder and enclosing central open passage 42. An internal support core 46 containing perforations 41 is disposed within the central passage 42, in contact with the interior peaks of the corrugations of the corrugated filter sheet 45, in order to provide internal structural support for the filter element.

The filter cylinder has one open end closed off by end cap 48, bonded to the filter sheet 45 and the perforated core 56 in a leaktight seal. The other open end of the filter cylinder is closed off by end cap 47, which has a central passage 68 therethrough. A tubular member in the form of cylindrical post 58, which is an integral part of the end cap 47, mates with and seals against a corresponding tubular member in the form of cylindrical post 59 integral with portion 34 of the housing. The posts 58 and 59 have mating sections which engage each other to provide a fluidtight and bacteriatight seal between the filter frustoconical element and the housing. A threaded adaptor 61 concentric to the post 58 is also formed as an integral part of end cap 47, and engages threads formed on the interior wall of the tubular post 59. The frustoconical sealing surfaces are formed with locking angles, such that the clearance between these two surfaces is reduced and a tighter seal is provided by the further tightening of the threaded adaptor 61. The relative lengths of the threads and the sealing surfaces are such that the frustoconical surfaces of the posts 58 and 59 are in partial contact prior to the threading engagement of the adaptor 61 to the tubular post 59. This ensures that the mating frustoconical surfaces and the threads will be aligned properly.

A connecting adaptor in the form of a hollow tapered nipple 64 designed to mate with and seal against the fluid line tubing extends outwardly from the threaded adaptor 61 through the open center of the cylindrical post 59 of the housing, to provide direct fluid communication between the interior of the filter element 44 and the tubing of the fluid line 66. The passage 68 makes possible direct fluid flow via the nipple 64 between the central open portion 42 of the filter element 44 and the fluid line 66.

A bushing 72 which also engages the threaded portion of the post 59 secures the tubing of the fluid line in a leaktight position over the tapered nipple 64. The bushing 72 is formed with two wing-like flanges 73, 180° apart, such that it can be readily hand-tightened or loosened, to facilitate connection and detachment of the filter assembly to the fluid line.

Similarly, an internally threaded cylindrical adaptor 76 extends inwardly from the center of housing portion 33. A hollow tapered nipple 74 located within the center of the adaptor 76 extends outwardly, to engage the fluid line tubing 75. A bushing 72 threadably engages the adaptor 76, and thereby secures the tubing of the fluid line 75 in a leaktight seal over the nipple 74.

Ribs 77 formed on the internal surface of the housing portion 34 align the filter element 44 within the housing 17. Protrusions 79 extending from the upper portion of the end cap 48 of the filter element 44 prevent the end cap 48 from closing off the line by resting on top of the adaptor 76. This can occur only in extreme cases of tolerance build-up, where the housing is as small as possible within the prescribed tolerances, and the element is as large as possible within the prescribed tolerances.

In normal use, fluid enters through the passage 78 of the tubing 75, passes through the nipple 74, and into the entrance chamber 71. The fluid then proceeds into the annular space 67 between the filter element and the housing, and thence through the filter sheet 45. Filtered fluid flows via the perforations 41 of the core 46 into the central passage 42, whence it passes via passage 68 into the downstream fluid line 66. It should be noted that the fluidtight seal between the tapered surfaces of the mating posts 58 and 59 prevents the external leakage of unfiltered fluid. However, should a leak develop at their juncture, under extreme circumstances, it is not possible for unfiltered fluid to enter the downstream fluid line 66, since the line 66 connects directly with the interior of the filter element via the outlet nipple 64. Therefore, there is no way for unfiltered fluid to by-pass the filter element. Furthermore, any leakage that may develop at the connection of the line 66 and the outlet nipple due to faulty installation will be of filtered fluid, and will not contaminate the surrounding area.

To remove the filter assembly of this invention from the fluid lines, the system is shut off, the bushings 72 are loosened, and the line 75 removed from the inlet nipple 74 and the line 66 from the outlet nipple 64. The filter assembly can then be discarded without disturbing the filter element and without the danger of fluid leakage, and a new assembly can be installed in a few seconds or minutes.

The filter assembly is vented of air before it is put onstream by opening the vent 80. Cap 87 is unthreaded, and the assembly allowed to fill gradually with fluid from line 75. As the fluid fills the annular space 67 before the filter, the air rises and, since the vent is at the higher end of the housing, it is a simple matter to vent all air. Then, the cap 87 is replaced. The air in the space 42 is less of a problem to remove, since it is crowded out by the flowing fluid which is unobstructed, but the air upstream of the filter 45 cannot so easily be vented, firstly, because it must pass through the filter, and secondly, because the filter when wetted or filled with fluid passes air only at pressures exceeding the bubble point.

The fluid flow through the filter assembly can also be in the reverse direction, from line 66 to line 75. In this event, the flow through the filter element 45 is from inside out, and in order to vent air upstream of the filter, the vent 80 must be arranged to tap the space 42 within the filter element 45 via end cap 48.

Having regard to the foregoing disclosure, the following is claimed as the inventive and patentable embodiments thereof:

1. A disposable filter assembly comprising a filter housing having an inlet and an outlet; a filter element permanently bonded to and confined between end caps in a fluidtight seal and disposed within the housing across the line of flow from the inlet to the outlet; and a tubular member attached to one end cap of the filter element and having an external sealing wall and an internal wall defining a fluid passage therethrough extending between the interior of the filter element and an inlet or outlet of the filter housing, and communicating the interior of the filter element and a fluid line attached to the housing, the tubular member attaching the filter element to the housing in a fluidtight seal between the external wall of the tubular member and an external wall of the housing at the inlet or outlet to provide a leakage path there between to the exterior of the housing in the event of leakage, and the tubular member also providing a direct through connection via the fluid passage thereof for flow of filtered fluid between the interior of the filter element and the fluid line, and a fluid-tight seal between an internal wall of the fluid line and the external wall of the tubular member to provide a leakage path therebetween to the exterior of the housing whereby all seals between the tubular member the filter housing and the fluid line are on external walls of the tubular member and the housing that provide leakage paths only to the exterior of the housing, and thus prevent the by-pass of unfiltered fluid to the line.

2. A disposable filter assembly in accordance with claim 1, in which the tubular member comprises a first tubular member extending outwardly from one end of the filter element; a second tubular member mating on the inside of one end of the filter housing, to engage and form a fluidtight seal against the first tubular member and a tubular adaptor extending outwardly from the interior of the filter element and within the first tubular member to connect with the fluid line, and provide direct fluid communication between the interior of the filter element and said line.

3. A disposable filter assembly in accordance with claim 2, in which the first tubular member and the second tubular member have tapered mating sealing surfaces.

4. A disposable filter assembly in accordance with claim 2, in which the tubular adaptor has connecting means adapted to engage the interior surface of the second tubular member to secure the two tubular members in fluidtight contact.

5. A disposable filter assembly in accordance with claim 4, in which the first tubular member and the tubular adaptor are formed as part of a filter element end cap.

6. A disposable filter assembly in accordance with claim 1, in which the housing has an air vent closed off by a removable cap.

7. A disposable filter assembly comprising two bell-shaped housing portions having mating flanges at their open ends which form a fluidtight seal; a cylindrical filter element disposed within the housing across the line of flow from the inlet to the outlet comprising a corrugated filter medium; a first end cap bonded to the filter medium to close off one open end of the element to ensure that fluid will not by-pass the filter medium; and a second end cap to close off the other open end of the element, said second end cap comprising a cylindrical hollow post extending outwardly from the element; a connecting adaptor in the form of a hollow tapered nipple concentric to and extending outwardly from within the post to communicate the interior of the filter element with and engage a fluid line; a mating section extending inwardly from the closed end of the first housing portion to mate with and seal against the cylindrical post of the filter element end cap; a cylindrical adaptor extending inwardly from the closed end of the second housing portion having a threaded interior surface; a tapered hollow nipple extending outwardly from within the threaded interior surface of the cylindrical adaptor to communicate the interior of the housing with a fluid line; and two threaded bushings to engage a threaded portion at the closed end of the first housing portion and the internally threaded surface of the cylindrical adaptor to secure the fluid lines in a fluidtight seal over the hollow tapered nipples.

8. A disposable filter assembly in accordance with claim 7, in which the cylinder hollow post of the element end cap has a tapered interior surface; the mating section of the housing comprises an inwardly extending second cylindrical hollow post having a threaded interior surface and a tapered exterior surface to mate with the tapered interior surface of the first cylindrical post; the lower portion of the connecting adaptor is threaded to engage the threaded interior surface of the second post to secure the two posts in fluidtight contact; and one threaded bushing engages the remaining threaded portion of the interior surface of the second post to secure the fluid line in a fluidtight seal over the tapered nipple connecting adaptor.

9. A disposable filter assembly in accordance with claim 7, in which the cylindrical hollow post of the element end cap has a flat circular shoulder formed into the leading edge of the exterior surface and a threaded interior surface; the mating section of the housing is formed with a cylindrical bore having a flat annular ledge and an inwardly extending lip encircling the outer periphery of the ledge, whereby the cylindrical post engages the cylindrical bore such that the circular shoulder abuts the annular ledge and the lip provides guidance for the cylindrical post, said shoulder being bonded to said ledge so that a permanent fluidtight seal is formed between the abutting surfaces; and one threaded bushing engages the threaded interior surface of the cylindrical post to secure the fluid line in a fluidtight seal over the tapered nipple connecting adaptor.

10. A disposable filter assembly in accordance with claim 9, in which the shoulder and ledge are spin-welded together.

11. A disposable filter assembly in accordance with claim 7, wherein the housing and element end caps are formed from plastic material.

12. A disposable filter assembly in accordance with claim 7, in which the threaded bushings each have two wing-like flanges 180° apart to facilitate hand tightening.

13. A disposable filter assembly in accordance with claim 7, in which the mating flanges of the two bell-shaped housing portions are bonded together to form a permanent leakproof connection.

14. A filter element adapted for attachment to a filter housing in a manner which provides both a fluidtight seal therebetween, to prevent external leakage, and a direct filtered fluid connection between the interior of the filter element and a fluid line, to prevent the bypass of unfiltered fluid, comprising a filter sheet folded in a closed configuration and having at least one end closed off by an end cap; a generally cylindrical hollow post extending outwardly from said end cap and adapted to seal to a mating section formed on the inside of one end of the filter housing; a hollow connecting adaptor extending outwardly from the end cap within the cylindrical post and adapted to engage a filtered fluid line and provide direct fluid communication between said line and the interior of the filter element.

15. A filter element in accordance with claim 14, in which the generally cylindrical hollow post has a tapered interior surface, and the lower portion of the connecting adaptor has connecting means to engage the interior surface of a second post on the housing to secure the two posts in fluidtight contact.

16. A filter element in accordance with claim 15, in which the lower portion of the connecting adaptor threadably engages the interior surface of the second post to secure the two posts in fluidtight contact 17. A filter element in accordance with claim 15, in which the tapered surfaces of the cylindrical posts have locking angles so that the clearance therebetween is diminished as the connecting adaptor is tightened.

18. A filter element in accordance with claim 15, in which the relative lengths of the lower portion of the connecting adaptor and the tapered cylindrical posts are such that the mating seal surfaces of the cylindrical posts are in partial contact prior to the engagement of the connecting means, to prevent misalignment of the seal surfaces and the connecting adaptor.

19. A filter element in accordance with claim 15, in which the connecting adaptor is a hollow tapered nipple for insertion into a fluid line, and a bushing engages the interior surface of the second post to secure the fluid line in a leak-tight connection over the tapered nipple.

20. A filter element in accordance with claim 14, in which the generally cylindrical hollow post has a flat circular shoulder formed into the leading edge of the exterior surface, adapted to engage a section of a housing formed with a cylindrical bore having a flat annular ledge and an inwardly extending lip encircling the outer periphery of the ledge, whereby the cylindrical post engages the cylindrical bore such that the circular shoulder abuts the annular ledge and the lip provides guidance for the cylindrical post, said shoulder being bonded to said ledge so that a permanent fluidtight seal is formed between the abutting surfaces.

21. A filter element in accordance with claim 20, in which the shoulder and ledge are adapted to be spin-welded together.

22. A filter element in accordance with claim 20, in which the connecting adaptor is a hollow tapered nipple for insertion into a fluid line, the interior surface of the cylindrical hollow post is threaded, and a bushing engages the threaded interior surface of the cylindrical post to secure the fluid line in a leaktight connection over the tapered nipple.

23. A filter element end cap for attaching a filter element to a filter housing comprising a generally cylindrical hollow post extending from the center to engage and form a fluidtight seal against a mating section in the filter housing, and a hollow connecting adaptor extending from within the cylindrical post to engage a fluid line and provide direct filtered fluid communication between said line and the interior of the filter element.

24. A filter element end cap in accordance with claim 23, in which the cylindrical post has a tapered interior surface to mate with and form a fluidtight seal against a corresponding tapered surface in the housing, and the connecting adaptor has a threaded lower portion and a tapered nipple end portion to secure the mating tapered surfaces in fluidtight contact and provide means for insertion into the fluid line.

25. A filter element end cap in accordance with claim 23, in which the cylindrical post has a flat circular shoulder formed into the leading edge of the exterior surface and threaded interior surface, and the connecting adaptor is a tapered nipple for insertion into a fluid line.

26. A disposable filter assembly comprising a filter housing having an inlet and an outlet; a filter element permanently bonded to and confined between end caps in a fluidtight seal and disposed within the housing across the line of flow from the inlet to the outlet; an air vent in the housing closed off by a removable cap, the air vent in the housing and the cap having tapered mating sealing surface; and means for attaching the filter element to the filter housing comprising a first tubular member extending outwardly from one end cap of the filter element; a second tubular member extending from the inside of one end of the filter housing, to engage and form a fluidtight seal against an external wall of the first tubular member, and a tubular adaptor extending outwardly from said end cap and communicating with the interior of the filter element and within the second tubular member to engage and form of fluidtight seal against the second tubular member and against a fluid line, and provide direct fluid communication between the interior of the filter element and said line.

27. A disposable filter assembly in accordance with claim 26, in which the tubular adaptor has connecting means adapted to engage the interior surface of the second tubular member to secure the two tubular members in fluidtight contact.

28. A disposable filter assembly in accordance with claim 27, in which the first tubular member and the tubular adaptor are formed as part of a filter element end cap.

29. A disposable filter assembly comprising a filter housing having an inlet and an outlet; a filter element permanently bonded to and confined between end caps in a fluidtight seal and disposed within the housing across the line of fluid flow from the inlet to the outlet; a first tubular member extending from one end cap of the filter element and communicating with the interior of the filter element; a second tubular member extending inwardly from an inlet or outlet of the filter housing to engage and form along an external wall thereof a fluidtight seal against an external wall of the first tubular member, with a fluid-leakage path therebetween leading to the exterior of the housing; the external walls of the first tubular member and the second tubular member having tapered mating sealing surfaces, the first and second tubular members together defining a direct through connection for filtered fluid flow between the interior of the filter element and a fluid line attached to the outlet, the fluidtight seal between the external walls of the first and second tubular members normally preventing leakage but providing a leakage path to the exterior of the housing in the event of any leakage and thereby preventing the by-pass of unfiltered fluid to the fluid line.

30. A disposable filter assembly in accordance with claim 29, in which a tubular adaptor connecting with a fluid line at the inlet or outlet extends interiorly of the second tubular member and exteriorly of the first tubular member, and seals therewith along an external wall of the second tubular member and an external wall of the first tubular member, the seals thereby providing a leakage flow path to the exterior of the housing and together with the first tubular member provides direct fluid communication between the interior of the filter element and the fluid line.

31. A disposable filter assembly in accordance with claim 30, in which the tubular adaptor and the first tubular member have tapered mating sealing surfaces.

32. A disposable filter assembly in accordance with claim 31, in which the first tubular member and the second tubular member are threadably engaged one to the other.

33. A disposable filter assembly comprising a filter housing having an unfiltered fluid inlet and a filtered fluid outlet; a filter element permanently bonded to and confined between end caps in a fluidtight seal and disposed within the housing across the line of fluid flow from the unfiltered fluid outlet; a first tubular member extending outwardly from one end cap of the filter element towards an inlet or outlet and communicating with the interior of the filter element; a second tubular member extending from said inlet or outlet of the housing to engage and form along an external wall thereof a fluidtight seal against an external wall of the first tubular member; and a one-piece tubular adaptor extending between the interior of the filter element and said inlet or outlet, separating the same from the interior of the housing and forming a fluidtight seal along an external wall thereof with external walls of both the first tubular member and the second tubular member and providing a leakage flow path from each seal to the exterior of the housing thereby preventing the by-pass of unfiltered fluid to the line and providing a direct through connection for filtered fluid flow between the interior of the filter element and a fluid line attached to the outlet.

34. A disposable filter assembly according to claim 33, in which the tubular attaching means extending between the filter element and the filtered fluid outlet is bonded to the housing at said inlet or outlet and to the filter element in a fluidtight seal integrating the same into one piece.

35. A disposable filter assembly comprising a filter housing having an unfiltered fluid inlet and a filtered fluid outlet; a filter element confined between end caps in a permanent fluidtight seal, and disposed within the housing across the line of fluid flow from the unfiltered fluid inlet to the filtered fluid; a first tubular member integral with and extending from one end cap of the filter element; a second tubular member integral with and extending from an inlet or outlet of the housing; the first tubular member extending within the second, and engaging the second in a fluidtight seal, each engaging the other along an external wall thereof providing a leakage flow path to the exterior of the housing and thereby attaching the end cap and the filter element to the housing, and providing a direct through connection for filtered fluid flow via the end cap from the interior of the filter element to a fluid line attached to the filtered fluid outlet while preventing by-pass of unfiltered fluid to the line.

36. A disposable filter assembly according to claim 35 in which the first and second tubular members are bonded together in a seal integrating the members into one piece.

37. A disposable plastic filter assembly integrated in one piece, comprising a plastic filter housing having an unfiltered fluid inlet and a filtered fluid outlet; a filter element permanently bonded to and confined between plastic end caps and disposed within the housing across the line of flow from the unfiltered fluid inlet to the filtered fluid outlet, and a plastic tubular member attached to one end cap of the filter element and having an external sealing wall and an internal wall defining a fluid passage therethrough extending between the interior of the filter element and the filter housing, and communicating the interior of the filter element and a fluid line attached to the housing, the tubular member attaching the filter element to the housing in a fluidtight seal between the external wall of the tubular member and an external wall of the housing at the inlet or outlet to provide a leakage path therebetween to the exterior of the housing in the event of leakage, and the tubular member also providing a direct through connection via the fluid passage thereof for flow of filtered fluid between the interior of the filter element and the fluid line, and a fluidtight seal between an internal wall of the fluid line and the external wall of the tubular member to provide a leakage path therebetween to the exterior of the housing whereby all seals between the tubular member, the filter housing and the fluid line are on external walls of the tubular member and the housing that provide leakage paths only to the exterior of the housing, and thus prevent the bypass of unfiltered fluid to the line, the tubular member being bonded to the housing at the outlet in a fluidtight seal integrating the attaching means, the housing and the end cap of the filter element in one piece.

38. A filter assembly comprising a filter housing having an inlet and an outlet; a filter element disposed within the housing across the line of flow from the inlet to the outlet; a first tubular member extending outwardly from one end of the filter element, a second tubular member extending inwardly from the filter housing at an inlet or outlet, and a fluid line connector disposed and clamped between the first and second tubular members in a fluidtight seal, at least one of the first tubular member and the second tubular members having a tapered mating sealing surface sealing with the line connector, and the line connector clamping surface having stepped sides, the first and second tubular members each having an external sealing wall and an internal wall defining a fluid passage therethrough extending between the interior of the filter element and the filter housing, and communicating the interior of the filter element and the interior of the line connector, the first and second tubular members attaching the filter element to the housing in a fluidtight seal between the external walls of the first and second tubular members to provide a leakage path therebetween to the exterior of the housing in the event of leakage, and the tubular members also providing a direct through connection via the line connector for flow of filtered fluid between the interior of the filter element and the fluid line, and a fluidtight seal between an internal wall of the line connector and the external wall of the second tubular member to provide a leakage path therebetween to the exterior of the housing, whereby all seals between the tubular members and the line connector are on external walls of the tubular members that provide leakage paths only to the exterior of the housing, and thus prevent the bypass of unfiltered fluid to the line.

39. A filter assembly according to claim 38, in which the first tubular member has a tapered sealing surface abutting the stepped side clamping surface of the line connector.

* * * * *

UNITED STATES PATENT OFFICE
CERTIFICATE OF CORRECTION

Patent No. 3,696,932      Dated October 10, 1972

Inventor(s) David Rosenberg

It is certified that error appears in the above-identified patent and that said Letters Patent are hereby corrected as shown below:

Column 1, line 27    :    "require" should be -- required --

Column 4, line 22    :    Change the period (.) to a comma (,) and "Maintaining" should be -- maintaining --

Column 4, line 65    :    "busing" should be -- bushing --

Column 6, line 10    :    "proposes" should be -- purposes --

Column 13, line 53    :    "cylinder" should be -- cylindrical --

Column 15, line 60    :    "surface" should be -- surfaces --

Column 16, line 2    :    "of" should be -- a --

Signed and sealed this 10th day of April 1973.

(SEAL)
Attest:

EDWARD M. FLETCHER, JR.            ROBERT GOTTSCHALK
Attesting Officer                   Commissioner of Patents